United States Patent Office 3,436,404
Patented Apr. 1, 1969

3,436,404
COMPOUNDS CONTAINING THE 2,5-DIOXABI-
CYCLO[4.3.0]NONANE RING STRUCTURE AND
METHODS OF PREPARATION
Wen-Hsuan Chang, Gibsonia, Pa., assignor to PPG Industries, Inc., a corporation of Pennsylvania
No Drawing. Continuation-in-part of application Ser. No. 234,846, Nov. 1, 1962. This application Apr. 10, 1967, Ser. No. 629,403
Int. Cl. C07d 13/04, 15/14, 15/12
U.S. Cl. 260—340.3                          11 Claims

ABSTRACT OF THE DISCLOSURE

This application relates to compounds produced from the reaction of a hexahalocyclopentadiene and a polyol having hydroxyl groups on adjacent carbon atoms corresponding to the formulae:

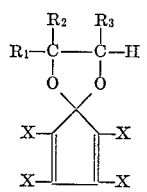

FORMULA A

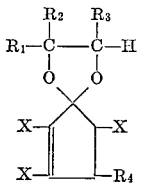

FORMULA B

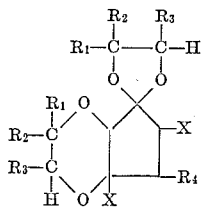

FORMULA C

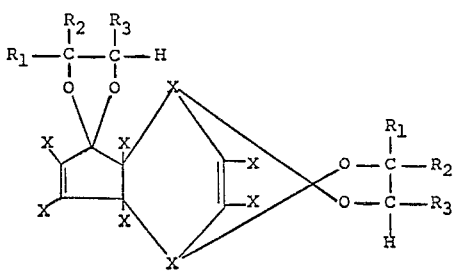

FORMULA D

In the above formulae, X represents chlorine or bromine and $R_1$, $R_2$, and $R_3$ are each selected from the class consisting of hydrogen and alkyl, cycloalkyl, aryl, alkoxyalkyl, aryloxyalkyl and hydroxyalkyl radicals usually having up to 20 carbon atoms, and preferably 1 to 10 carbon atoms. $R_4$ is either the structure:

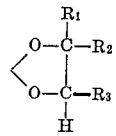

or the structure:

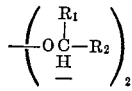

where $R_1$, $R_2$ and $R_3$ are as above.

CROSS-REFERENCES TO RELATED APPLICATIONS

This application is a continuation-in-part of U.S. application Ser. No. 234,846, filed Nov. 1, 1962, now abandoned.

STATE OF THE PRIOR ART

The reaction of hexachlorocyclopentadiene with an excess of ethylene glycol has been reported heretofore by Newcomer and McBee in the Journal of the American Chemical Society, volume 71, page 946 (1949). According to this article, the reaction when carried out at 50° C. to 60° C. produces 1,2,3,4,11,12,13,14-octachloro-6,9,15, 18 - tetraoxadispiro[4.4.4.4]-1,3-11,13 - octadecatetraene, which has the formula:

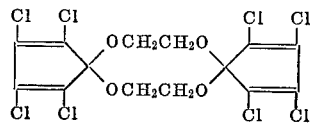

DESCRIPTION OF THE INVENTION

It has now been found that the reaction of hexahalocyclopentadiene with ethylene glycol or a polyol of the ethylene glycol type, i.e., having hydroxyl groups on adjacent carbon atoms, can be carried out in such a way as to produce several products quite different from that reported in the above article. The temperature of the reaction and the amount of base catalyst employed determines the particular nature of the product obtained.

While the compounds referred to are basically all produced from hexahalocyclopentadiene and a polyol having adjacent hydroxyl groups in the presence of a base, they correspond to several general formulae which are set forth below:

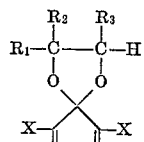

FORMULA A

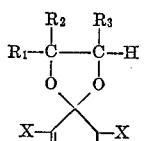

FORMULA B

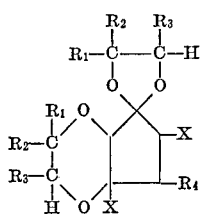

FORMULA C

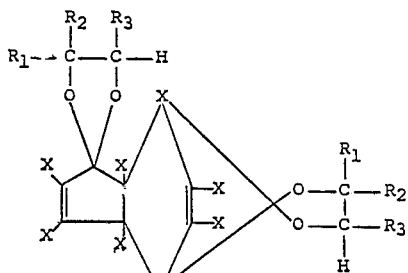

FORMULA D

In the above formulae, X represents chlorine or bromine and $R_1$, $R_2$, and $R_3$ are each selected from the class consisting of hydrogen and alkyl, cycloalkyl, aryl, alkoxyalkyl, aryloxyalkyl and hydroxyalkyl radicals usually having up to 20 carbon atoms, and preferably 1 to 10 carbon atoms. $R_4$ is either the structure:

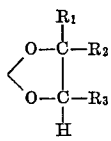

or the structure:

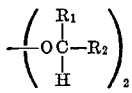

where $R_1$, $R_2$, and $R_3$ are as above.

In the foregoing Formula B and Formula C, it is to be noted that the substituents designated as $R_1$, $R_2$ and $R_3$ occur more than once in each formula. In these instances, each $R_1$ group may refer to a different radical selected from the group set forth, and each $R_2$ and each $R_3$ may similarly be different. Such compounds are obtained, for example, when produced by a method in which successive reactions with an alcohol are employed and a different alcohol is used in each step. Compounds of this type are included within the scope of the various embodiments of the invention disclosed and claimed herein.

In producing the compounds of the formulae set forth above, any polyol having hydroxyl groups attached to adjacent carbon atoms can be employed. Such polyols correspond to the formula:

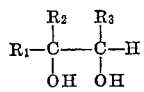

where $R_1$, $R_2$ and $R_3$ are as defined above; these radicals in the polyol correspond to those in the above formulae. Examples of such polyols used to produce the various compounds above include aliphatic polyols such as ethylene glycol, 1,2-propanediol, 1,2-butanediol, 2-methyl-2,3-butanediol, 1,2-pentanediol, 2,3-pentanediol, 1,2-hexanediol, 5,6-decanediol, 2-methyl-3,4-pentanediol and 2,2-dimethyl-3,4-butanediol; alicyclic polyols such as cyclohexyl-1,2-ethanediol; aryl-substituted polyols such as phenyl-1,2-ethanediol; alkoxy-substituted polyols such as 1-methoxy-2,3-propanediol; aryloxy-substituted polyols such as 1-phenoxy-2,3-propanediol; and polyols containing additional hydroxyl groups in addition to those on the adjacent carbon atoms, such as 1,2,6-hexanetriol. In each instance, the polyol must have at least 2 carbon atoms, and for most purposes it is preferred to use polyols having a total of between 2 and 30 carbon atoms and in which each R group is either hydrogen or alkyl of up to 20 carbon atoms. It has been found further that the reaction is best carried out with polyols in which the hydroxyl groups are both bonded to either primary or secondary carbon atoms, i.e., polyols in which $R_2$ is hydrogen.

The alcohols employed in preparing the compounds of this invention may contain additional substituents which do not prevent the reaction. As can be seen from the above, even compounds having more than two hydroxyl groups may be employed. The preferred alcohols comprise compounds containing only carbon, hydrogen and oxygen.

Hexahalocyclopentadiene, as used throughout the specification, refers to a chloro- or bromo-substituted cyclopentadiene, for example, hexachlorocyclopentadiene or hexabromocyclopentadiene.

The reactions to produce the compounds of this invention are base-catalyzed. While essentially any base catalyst, as that term is understood in the art, can be used, it is preferred to employ inorganic bases, including the hydroxides, alkoxides and oxides of metals such as lithium, potassium, sodium, calcium, magnesium and the like. The metals themselves, e.g., metallic sodium, can also be employed, and provide quite satisfactory results. Organic bases such as amines are less satisfactory, since they tend to reduce the yield by promoting side reactions which compete with the desired reaction. The most desirable bases from an economic standpoint are the hydroxides of the alkali metals and these also provide the best results.

As is more fully set forth hereinbelow, the amount of base employed, as well as the temperature at which the reaction is carried out, determines the particular nature of the product resulting from the reaction of the hexahalocyclopentadiene and the polyol. Aside from these, however, other reatcion conditions are not critical and may be varied widely. For example, the reaction can be carried out in the presence of a solvent if desired, although quite often the excess polyol or hexahalocyclopentadiene is used as the only solvent. Other inert solvents such as ethylene glycol dimethylether, diethylene glycol dimethylether, tetrahydrofuran, acetamide, and the like, can be used with similar effectiveness, and when the polyol employed is a solid, it is often desirable to have such a solvent present.

The compounds corresponding to Formula A above are produced by the reaction of hexahalocyclopentadiene with a polyol in the presence of a base, as defined above. The temperature at which the reaction is carried out is below about 50° C. and preferably below about 35° C. in order to obtain the product in good yield. The temperature may also be below room temperature, for instance, 0° C. or lower, if desired.

Compounds of Formula B above are also produced during the reaction as described above to produce compounds of Formula A, although the yield is usually very low unless sufficient polyol, i.e., at least about 2 moles per mole of hexahalocyclopentadiene, as well as sufficient base, again at least about 2 moles per mole of hexahalocyclopentadiene, are employed.

Using these proportions of reactants, good yields of compounds of the Formula B are produced and, while low temperatures such as those described above can be used, the reaction may also be carried out at temperatures up to about 120° C. or higher and it is preferred to use temperatures of at least about 50° C. The Formula B compounds are also conveniently made by reaction of compounds of the Formula A with additional polyol in the presence of additional base, using temperatures between about 40° C. and about 120° C. This reaction can be carried out with a different alcohol from that used to make the compound of the Formula A; it may be any alcohol, either monohydric or polyhydric and having the hydroxyl groups either on adjacent or nonadjacent carbon atoms. For example, in addition to those polyols enumerated above, polyols such as 1,3-propanediol, 1,4-butanediol, 2,2-dimethyl-1,3-propanediol, trimethylolpropane, pentaerythritol, polyethylene glycols and the like, as well as monohydric alcohols such as methanol, ethanol, heptanol and octanol, and other alcohols of the formula:

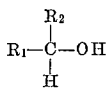

where $R_1$ and $R_2$ are as above, can be employed. When Compound A is reacted further with a polyol having hydroxyls on adjacent carbon atoms, the $R_4$ group in Formula B has the structure:

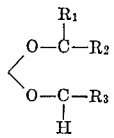

where $R_1$, $R_2$, and $R_3$ are again derived from the polyol and are as defined above. When, however, a monohydric alcohol or a polyol having hydroxyls on non-adjacent atoms is used in making the compound of the Formula B, the $R_4$ group is of the structure:

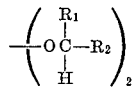

where $R_1$ and $R_2$ are as defined above. In these instances, one hydroxyl group from each of two alcohol molecules reacts with the hexahalocyclopentadiene nucleus, whereas in the case of the polyol having adjacent hydroxyl groups, both hydroxyl groups reacting with the hexahalocyclopentadiene are attached to the same polyol molecule.

The compounds of Formula B can also be produced by changing the order of reaction, that is, by first reacting hexahalocyclopentadiene with the monohydric alcohol to produce a compound of the structure:

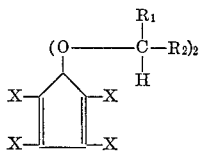

and then reacting this compound with the polyol.

It may be noted that the double bond in Formula B is shown in the 3-position. However, depending upon the particular reactants and reaction conditions, the double bond in all or part of the product obtained in particular cases may be in the 2-position. The compounds are considered equivalent for purposes of this invention, and names and formulas herein are intended to include both isomers as well as the mixture.

The compounds of Formula C are also obtained from the reaction of polyol with the hexahalocyclopentadiene in the manner used to produce compounds of Formula A, if sufficient polyol and sufficient base are present. However, even utilizing excesses of the polyol and base, the yields of compounds of Formula C are quite low in any reasonable length of time. For this reason, compounds of Formula C are better produced indirectly by reacting a preformed compound of Formula A with at least two additional moles of polyol in the presence of at least two additional moles of base, or by reacting a preformed compound of Formula B with at least one additional mole of each of the polyol and the base. The temperature may vary from 80° C. up to about 140° C. or even higher. It is noteworthy to observe that in the compounds of Formula C, the third mole of the polyol attaches to the hexahalocyclopentadiene nucleus in a different manner than the first two molecules, in that each of the hydroxyl groups from the third mole of polyol attaches to a different carbon atom.

The compounds of Formula D are dimers of the compounds of Formula A and are produced whenever a compound of Formula A is heated to a temperature above its melting point. The dimer is also obtained whenever a compound of Formula A is dissolved in a solvent in which it has an appreciable solubility, although relatively long periods of time, several days or longer, are required for the dimerization unless the solution is heated. Some examples of such solvents which may be so employed to produce these compounds are chloroform, benzene, toluene, ethyl acetate and tetrahydrofuran. The dimerization of compounds of Formula A is quite surprising and unexpected, since the most closely related known cyclopentadiene derivatives do not form dimers.

It may be noted that the ranges of conditions and proportions which produce the several compounds depicted above overlap. In such instances, mixtures of the different products may be obtained; however, by proper choice of the conditions and proportions, good yields of any of the above compounds are achieved.

The several compounds to which this invention relates will be further described by reference to the following examples; these examples, being illustrative, should not be construed as limiting the invention to their details.

Example I.—1,2,3,4-tetrachloro-6,9-dioxa-1,3-spiro[4.4]nonadiene

A two-liter, round bottom flask was charged with 1 mole of hexachlorocyclopentadiene. A solution of 137 grams (2.10 moles, 85 percent purity) of potassium hydroxide in ethylene glycol (496.0 grams, 8.0 moles) was added dropwise at 25° C. to 33° C. When two-thirds of the glycol solution had been added, there was one liquid phase and some precipitated potassium chloride. The remainder of the solution was added and the reaction mixture was stirred at 25° C. to 30° C. for 20 hours; the pH was then 8.0. One liter of water was added and the layers were separated. The water layer was extracted with ether and the combined organic layers were washed with saturated sodium chloride solution and the organic solvent removed under vacuum. When the organic layer was nearly evaporated to dryness, ligroin was added and the solution cooled to −78° C. and filtered. There was obtained 206 grams of the above product.

*Analysis.*—Calculated for $C_7H_9Cl_4O_2$: Carbon, 32.01%; hydrogen, 1.54%; chlorine, 54.15%. Found: Carbon, 31.97%; hydrogen, 1.63%; chlorine, 54.02%.

Obviously, when hexabromocyclopentadiene is employed, the tetrabromo equivalent will be formed.

Example II.—1,2,3,4-tetrachloro-7-methyl-6,9-dioxa-1,3-spiro[4.4]nonadiene

A three-necked, two-liter, round bottom flask was charged with 1 mole (73 grams) of hexachlorocyclopentadiene, 2 moles (152.0 grams) of 1,2-propanediol and 300 milliliters of dimethoxyethane. To this solution 2.0 moles (132.4 grams, 85 percent purity) of potassium hydroxide were added in portions while the temperature was kept at 26° C. to 33° C. by external cooling. It took 45 minutes for the addition. The heterogeneous mixture was stirred at 26° C. overnight; the resultant solution had a pH of 8.5. To this solution, water was added and the organic layer was washed with water six times, dissolved in ether and filtered through Celite. After the solvent was removed at room temperature in vacuo, there was obtained 25 grams of crude product which was distilled to give pure 1,2,3,4-tetrachloro-7-methyl-6,9-dioxa-1,3-spiro[4.4]nonadiene, boiling point 80° C. at 0.07 millimeter, as identified by gas chromatographic analysis. Upon careful distillation, the pure sample boiled at 69° C. at 0.04 milliliter.

*Analysis.*—Calculated for $C_8H_6Cl_4O_2$: Carbon, 34.82%; hydrogen, 2.19%; chlorine, 51.40%. Found: Carbon 34.82%; hydrogen, 2.32%; chlorine, 51.38%.

The use of hexabromocyclopentadiene will produce 1,2,3,4 - tetrabromo - 7 - methyl-6,9-dioxa-1,3-spiro[4.4]nonadiene.

Example III.—1,2,3,4-tetrachloro-7,8-dimethyl-6,9-dioxa-1,3-spiro[4.4]nonadiene

To a three-necked, two-liter round bottom flask containing 135 grams (1.5 moles) of 2,3-butanediol, 273 grams (1 mole) of hexachlorocyclopentadiene and 300 milliliters of dimethoxyethane, solid potassium hydroxide (132.4 rams, 2 moles, 85 percent purity) was added in portions with external cooling, while the temperature was kept at 30° C. The addition took 45 minutes and the reaction mixture was stirred overnight at 26° C. Water was then added, whereupon an oily product precipitated which was separated and washed with water. Ether was added and the solution was washed with saturated sodium chloride solution until neutral. After evaporation of the solvent under vacuum at room temperature, there remained a crude product, 10 grams of which was distilled to give 6.65 grams of a fraction boiling at 60° C. to 100° C. at 0.1 millimeter, which was recrystallized from petroleum ether (boiling point 35° C. to 60° C.) at solid carbon dioxide temperature five times to give the pure product which melted at 40° C. to 40.5° C.

*Analysis.*—Calculated for $C_9H_8Cl_4O_2$: Carbon, 37.27%; hydrogen, 2.78%; chlorine, 48.91%. Found: Carbon, 37.84%; hydrogen, 3.05%; chlorine, 48.49%.

The use of hexabromocyclopentadiene will produce 1,2,3,4-tetrabromo - 7,8 - dimethyl - 6,9 - dioxa-1,3-spiro [4.4]nonadiene.

To produce the compounds of this invention, the polyol must have at least two hydroxyl groups on adjacent carbon atoms. If the only hydroxyl groups in the polyol are on non-adjacent carbon atoms, products of a completely different class are obtained, as is disclosed in copending application Ser. No. 234,847, filed Nov. 1, 1962, now U.S. Patent 3,358,039. However, the polyol used herein may have hydroxyls on nonadjacent carbon atoms in addition to those hydroxyls on adjacent carbon atoms, and the products obtained are as described herein, although the yields may be reduced by the competing reaction taking place with the adjacent hydroxyl groups. Set forth below is an example of the reaction using such a polyol.

Example IV.—7(4'-hydroxybutyl)-1,2,3,4-tetrachloro-6,9-dioxaspiro[4.4]-nona-1,3-diene To a two-liter, three-necked flask were added 675 grams (5 moles) of 1,2,6-hexanetriol and 64.4 grams (0.97 mole, 85 percent purity) of solid potassium hydroxide in portions at 90° C. to 100° C. The solution was cooled and hexachlorocyclopentadiene (137.0 grams, 0.50 mole) was added dropwise at 23° C. to 28° C. while the flask was cooled externally. After the addition, the reaction mixture was stirred at 30° C. for 24 hours (pH was then 8.0). The product was extracted with 500 milliliters of ligroin (boiling point 60° C. to 78° C.) to remove 19.2 grams of the unreacted hexachlorocyclopentadiene. Chloroform was added and the mixture was then washed with saturated sodium chloride solution until neutral. The solvent was removed in vacuum to give 148 grams of a mixture of 7(4'-hydroxybutyl)-1,2,3,4-tetrachloro - 6,9 - dioxaspiro[4.4]-nona-1,3-diene, the desired product, and 5,5-bis(5,6-dihydroxyhexyloxy)-1,2,3,4-tetrachloro-1,3-cyclopentadiene. The products were analyzed by ultraviolet light absorption infrared examination.

In a similar manner the following compounds are likewise formed:

1,2,3,4-tetrachloro-7,7,8-trimethyl-6,9-dioxa-1,3-spiro [4.4]nonadiene 1,2,3,4-tetrabromo-7,7,8-trimethyl-6,9-dioxa-1,3-spiro [4.4]nonadiene 1,2,3,4-tetrachloro-7-cyclohexyl-6,9-dioxa-1,3-spiro [4.4]nonadiene 1,2,3,4-tetrabromo-7-cyclohexyl-6,9-dioxa-1,3-spiro [4.4]nonadiene 1,2,3,4-tetrachloro-7-phenyl-6,9-dioxa-1,3-spiro [4.4]nonadiene 1,2,3,4-tetrabromo-7-phenyl-6,9-dioxa-1,3-spiro[4.4] nonadiene 1,2,3,4-tetrachloro-7-methoxy-8-methyl-6,9-dioxa-1,3-spiro[4.4]nonadiene 1,2,3,4-tetrabromo-7-methoxy-8-methyl-6,9-dioxa-1,3-spiro[4.4]nonadiene 1,2,3,4-tetrachloro-7-phenoxy-8-methyl-6,9-dioxa-1,3-spiro[4.4]nonadiene 1,2,3,4-tetrabromo-7-phenoxy-8-methyl-6,9-dioxa-1,3-spiro[4.4]nonadiene The above examples illustrate the compounds of the invention corresponding to Formula A. Below are several examples of products corresponding to Formula B. Examples V to VII demonstrate those compounds of Formula B which are produced from polyols, whereas Examples 8 and 9 demonstrate the similar compounds made from monohydric alcohols.

Example V.—1,2,4-trichloro-3-ethylenedioxy-6,9-dioxa-1-spiro[4.4]nonene

An ether solution of 1,2,3,4-tetrachloro-6,9-dioxa-1,3-spiro[4.4]nonadiene (0.20 mole, 52.4 grams) was added slowly at 65° C. to a flask containing 74.4 grams (1.20 moles) of ethylene glycol and 31.2 grams (0.60 mole, 85 percent purity) of potassium hydroxide. The ether was removed continuously during the addition by distillation at 20 millimeters vacuum. After all of the nonadiene was added and most of the ether was removed, the mixture was stirred at 65° C. to 70° C. for 22.5 hours. The reaction product was cooled slowly to room temperature, water was added, and the heterogeneous mixture was filtered. A solid was collected by filtration and was then distilled to give 34.4 grams of pure product, boiling point 120° C. to 130° C. at 0.04 millimeter. It was identified by gas chromatographic and infrared analysis, as well as chemical analysis.

*Analysis.* — Calculated for $C_9H_9Cl_3O_4$: carbon, 37.59%; hydrogen, 3.15%; chlorine, 37.00%. Found: carbon, 37.95%; hydrogen, 3.46%. chlorine, 37.48%.

The use of 1,2,3,4-tetrabromo-6,9-dioxa-1,3-spiro[4.4] nonadiene produces 1,2,4-tribromo-3-ethylenedioxy-6,9-dioxa-1-spiro[4.4]nonene.

Example VI.—1,2,4-trichloro-3-(1,2-propylenedioxy)-7-methyl-6,9-dioxa-1-spiro[4.4]nonene A three-necked, five-liter flask was charged with 12.1 moles (920 grams) of propylene glycol. Potassium hydroxide (10.7 moles, 600 grams, 85 percent purity) was added in portions until all was dissolved. To this solution, 575 milliliters of dimethoxyethane and 250 milliliters of ligroin were added, and the mixture was refluxed at 62° C. Hexachlorocyclopentadiene (2 moles, 545.6 grams) was added dropwise to the refluxing mixture; the temperature went to 64° C. After all of the hexachlorocyclopentadiene was added, the mixture was stirred and refluxed at 59° C. for several hours while removing 35 milliliters of water. The product was then mixed with 1 liter of water and neutralized with dilute hydrochloric acid. The organic layer was washed with water and dried on a steam bath in vacuum. The oily residue was distilled and 342.6 grams of the product was collected at 0.1 to 0.45 millimeter. This crude product was redistilled to give 224.4 grams of the pure product, boiling point 102° C. at 0.038 millimeter pressure.

*Analysis.*—Calculated for $C_{11}H_{13}Cl_3O_4$: Carbon, 41.86%; hydrogen, 4.15%; chlorine, 33.70%. Found: Carbon, 41.86%; hydrogen, 4.15%; chlorine, 33.71%.

The use of hexabromocyclopentadiene produces 1,2,4-tribromo - 3 - (1,2-propylenedioxy)-7-methyl-6,9-dioxa-1-spiro[4.4]nonene.

Example VII

The same compound as in Example VI was also prepared by further reaction of 1,2,3,4-tetrachloro-7-methyl-6,9-dioxa-1,3-spiro[4.4]nonadiene with propylene glycol in the presence of potassium hydroxide, as follows: Four grams of potassium hydroxide were dissolved in 100 milliliters of propylene glycol at 80° C. To this solution was added a solution of 4.95 grams of 1,2,3,4-tetrachloro-7-methyl-6,9-dioxa-1,3-spiro[4.4]nonadiene in 5.0 milliliters of dimethoxyethane and the mixture was stirred for 20 hours at 60° C. Water and ether were then added to the reaction product and the ether layer was washed with water until neutral. The ether layer was then dried over anhydrous sodium sulfate and evaporated to yield 4.20 grams of an oily residue, which boiled at 120° C. at 0.1 millimeter and which was identified by infrared analysis as 1,2,4 - trichloro-3-(1,2-propylenedioxy)-7-methyl-6,9-dioxa-1-spiro[4.4]nonene.

The use of 1,2,3,4-tetrabromo-7-methyl-6,9-dioxa-1,3-spiro[4.4]nonadiene produces 1,2,4-tribromo-3-(1,2-propylenedioxy)-7-methyl-6,9-dioxa-1-spiro[4.4]nonene.

Example VIII.—3.3-dimethoxy-1,2,4-trichloro-6,9-dioxa-1-spiro[4.4]nonene

A three-necked, 500-milliliter round bottom flask was charged with 54.4 grams (1.7 moles) of methanol and 31.2 grams (0.6 mole, 85 percent purity) of potassium hydroxide. At 65° C. to 70° C., 1,2,3,4-tetrachloro-6,9-dioxa-1,3-spiro[4.4]nonadiene (52.4 grams, 0.20 mole) in 60 milliliters of dimethoxyethane was added dropwise. The reaction mixture was stirred at 65° C. for 2 hours. Water and ether were added to the cooled product and the organic layer was washed with water three times, dried and distilled, yielding 54.5 grams of a fraction boiling at 88° C. to 90° C. at 0.03 to 0.035 millimeter. The distillate was added to petroleum ether (boiling point 35° C. to 60° C.) and the crystallized product was filtered. The solid, melting point 51° C. to 63° C., was recrystallized three times from ligroin to give 29.5 grams of the product, which melted at 67.5° C. to 68.5° C.

*Analysis.* — Calculated for $C_9H_{11}Cl_3O_4$: Carbon 37.33%; hydrogen, 3.83%; chlorine, 36.74%. Found: carbon 37.73%; hydrogen, 3.85%; chlorine, 36.89%.

The use of 1,2,3,4-tetrabromo-6,9-dioxa-1,3-spiro[4.4] nonadiene produces 3,3-dimethoxy-1,2,4-tribromo-6,9-dioxa-1-spiro[4.4]nonene.

Example IX

The same compound produced in Example VIII was made as follows: Hexachlorocyclopentadiene was reacted with methanol in the presence of potassium hydroxide to produce 1,2,3,4-tetrachloro-5,5-dimethoxycyclopentadiene (52.8 grams, 0.20 mole), which was then added at 105° C. to a flask containing 74.4 grams (1.20 moles) of ethylene glycol and 31.2 grams (0.60 mole, 85 percent purity) of potassium hydroxide. The mixture was stirred for 2 hours and filtered; 12.5 grams of potassium chloride was separated. The filtrate was mixed with water and ether, and the ether layer was separated and washed until neutral. Crystallization from ligroin gave 48.5 grams of product, melting point 67° C. to 68.5°. The 3,3-dimethoxy - 1,2,4-trichloro-6,9-dioxa-spiro[4.4]nonene was identified by mixed melting point, infrared spectra and gas chromatographiy.

The use of hexabromocyclopentadiene produces 3,3-dimethoxy - 1,2,4-tribromo-6,9-dioxa-1-spiro[4.4]nonene.

In the manner of the above two-stage examples, the following compounds can also be prepared by further reacting 1,2,3,4-tetrachloro-6,9-dioxa-1,3-spiro[4.4]nonadiene or 1,2,3,4-tetrabromo-6,9-dioxa-1,3-spiro[4.4]nonadiene with the appropriate alcohol:

1,2,4-trichloro-3(1,2-hexanedioxy)-6,9-dioxa-1-spiro-[4.4]nonene
1,2,4-tribromo-3(1,2-hexanedioxy)-6,9-dioxa-1-spiro-[4.4]nonene
1,2,4-trichloro-3(cyclohexyl-1,2-ethanedioxy)-6,9-dioxa-1-spiro[4.4]nonene
1,2,4-tribromo-3(cyclohexyl-1,2-ethanedioxy)-6,9-dioxa-1-spiro[4.4]nonene
1,2,4-trichloro-3(phenyl-1,2-ethanedioxy)-6,9-dioxa-1-spiro[4.4]nonene
1,2,4-tribromo-3(phenyl-1,2-ethanedioxy)-6,9-dioxa-1-spiro[4.4]nonene
1,2,4-trichloro-3(methoxy-2,3-propanedioxy)-6,9-dioxa-1-spiro[4.4]nonene
1,2,4-tribromo-3(methoxy-2,3-propanedioxy)-6,9-dioxa-1-spiro[4.4]nonene
1,2,4-trichloro-3(phenoxy-2,3-propanedioxy)-6,9-dioxa-1-spiro[4.4]nonene
1,2,4-tribromo-3(phenoxy-2,3-propanedioxy)6,9-dioxa-1-spiro[4.4]nonene
1,2,4-trichloro-3(6-hydroxy-1,2-hexanedioxy)-6,9-dioxa-1-spiro[4.4]nonene
1,2,4-tribromo-3(6-hydroxy-1,2-hexanedioxy)-6,9-dioxa-1-spiro[4.4]nonene
1,2,4-trichloro-3,3-bis(4-hydroxy-1-butoxy)-6,9-dioxa-1-spiro[4.4]nonene
1,2,4-tribromo-3,3-bis(4-hydroxy-1-butoxy)-6,9-dioxa-1-spiro[4.4]nonene
1,2,4-trichloro-3,3(dioctyloxy)-6,9-dioxa-1-spiro[4.4]-nonene
1,2,4-tribromo-3,3(dioctyloxy)-6,9-dioxa-1-spiro[4.4]-nonene Examples X to XII illustrate the method of making the compositions of Formula C. Examples XI and XII also demonstrate reactions in which different polyols are used in successive steps to produce compounds having different substituents corresponding to $R_1$.

Example X.—1,8-dichloro-7,9 - bis(ethylenedioxy)-2,5-dioxabicyclo[4.3.0]-nonane To a three-necked, 1-liter flask there was added a solution of 74.4 grams (1.2 moles) of ethylene glycol and 31.2 grams (0.6 mole, 85 per cent purity) of potassium hydroxide. A solution of 1,2,4-tetrachloro-3-ethylenedioxy-6,9-dioxa-1-spiro[4.4]nonene (57.2 grams, 0.20 mole) in 100 milliliters of dimethoxyethane was added dropwise at 117° C. to 120° C. while low-boiling solvent was constantly removed. The addition took 20 minutes and the mixture was refluxed at 120° C. for 8 hours. Water was added and the product was filtered to give a crude product melting at 114° C. to 130° C. This solid was distilled and the fraction boiling at 150° C. at 0.018 millimeter (45.05 grams) was recrystallized from acetone-methanol. The product obtained melted at 142.5° C. to 143° C.

*Analysis.*—Calculated for $C_{11}H_{14}Cl_2O_6$: Carbon, 42.19%; hydrogen, 4.51%; chlorine, 22.65%. Found: Carbon, 41.91%; hydrogen, 4.32%; chlorine, 22.04%.

The use of 1,2,4-tetrabromo-3-ethylenedioxy-6,9-dioxa-1-spiro[4.4]nonene produces 1,8-dibromo-7,9-bis(ethylenedioxy)-2,5-dioxabicyclo[4.3.0]nonane.

Example XI.—1,8-dichloro-7,9 - bis(ethylenedioxy) - 3-methyl-2,5-dioxabicyclo[4.3.0]nonane Hexachlorocyclopentadiene was reacted with ethylene glycol in the presence of potassium hydroxide to produce 1,2,3,4-tetrachloro-6,9-dioxa-1,3-spiro[4.4]nonadiene as in Example I above, and this product was reacted with additional ethylene glycol as in Example V to produce 1,2,4-trichloro-3-ethylenedioxy-6,9 - dioxa - 1-spiro[4.4]-nonene. One mole (28.73 grams) of this product dissolved in 50 milliliters of 1,2-dimethoxyethane was added dropwise to a flask containing a solution of 0.3 mole of potassium hydroxide (20 grams, 85 percent purity) in 0.6 mole (45.6 grams) of propylene glycol at 120° C. The temperature was held at 120° C. for 8 hours and at room temperature overnight. Water was added and the oil layer which precipitated was separated and washed several times with water. The water layer was washed with ether and the ether added to the oil. The oil was distilled and the crude product boiling at 160° C. at 0.3 millimeter pressure was redistilled to yield 10.3 grams of pure product having a boiling point of 146° C. at 0.07 millimeter. The use of 1,2,4-tribromo-3-ethylenedioxy-6,9-dioxa-1-spiro[4.4]nonene produces 1,8-dibromo-7,9-bis(ethylenedioxy)-3-methyl-2,5-dioxabicyclo[4.3.0]nonane.

Example XII.—1,8-dichloro-7,9-bis(1,2-propylenedioxy)-2,5-dioxabicyclo[4.3.0]nonane 1,2,4-trichloro-3-(1,2-propylenedioxy - 7 - methyl-6,9-dioxa-1-spiro[4.4]nonene (0.1 mole, 31.6 grams) was produced from hexachlorocylclopentadiene and propylene glycol in the manner of Example VI above and added to a flask containing a solution of 20 grams of potassium hydroxide (0.3 mole, 85 percent purity) in 37.2 grams of ethylene glycol (0.6 mole) at 135° C. The mixture was stirred at 135° C. to 140° C. for 8 hours. After standing at room temperature overnight, water was added and the oil layer which separated was washed with water several times. The water layer was washed with ether and the ether added to the oil. Distillation produced 12 grams of crude material, which was redistilled to yield 11.7 grams of pure product boiling at 120° C. to 126° C. at 0.1 millimeter of pressure. The use of 1,2,4-tribromo-3-(1,2-propylenedioxy)-7-methyl-6,9-dioxa - 1 - spiro[4.4]-nonene produces 1,8-dibromo - 7,9-bis(1,2-propylenedioxy)-2,5-dioxabicyclo[4.3.0]nonane.

In the manner of Example XII, the following compounds can also be prepared by further reacting 1,2,4-trichloro-3-(1,2-propylenedioxy)-7-methyl-6,9 - dioxa-1-spiro[4.4]nonene or 1,2,4-tribromo - 3 - (1,2-propylenedioxy)-7-methyl-6,9-dioxa-1-spiro[4.4]nonene with the appropriate hydroxy compound:

1,8-dichloro-7,9-bis(ethylenedioxy)-3-methyl-2,5 - dioxabicyclo[4.3.0]nonane
1,8-dibromo-7,9-bis(ethylenedioxy)-3-methyl-2,5 - dioxabicyclo[4.3.0]nonane
1,8-dichloro-7,9-bis(ethylenedioxy)-3-octyl-2,5 - dioxabicyclo[4.3.0]nonane
1,8-dibromo-7,9-bis(ethylenedioxy)-3-octyl-2,5 - dioxabicyclo[4.3.0]nonane
1,8-dichloro-7,9-bis(ethylenedioxy)-3-cyclohexyl-2,5 - dioxabicyclo[4.3.0]nonene
1,8-dibromo-7,9-bis(ethylenedioxy) - 3 - cyclohexyl-2,5-dioxabicyclo[4.3.0]nonene
1,8-dichloro-7,9-bis(ethylenedioxy)-3-phenyl-2,5 - dioxabicyclo[4.3.0]nonane
1,8-dibromo-7,9-bis(ethylenedioxy)-3-phenyl - 2,5-dioxabicyclo[4.3.0]nonane
1,8-dichloro-7,9-bis(ethylenedioxy)-3-methoxy - 2,5 - dioxabicyclo[4.3.0]nonane
1,8-dibromo-7,9-bis(ethylenedioxy)-3-methoxy - 2,5 - dioxabicyclo[4.3.0]nonane
1,8-dichloro-7,9-bis(ethylenedioxy) - 3-phenoxy-4-methyl-2,5-dioxabicyclo[4.3.0]nonane
1,8-dibromo-7,9-bis(ethylenedioxy)-3-phenoxy-4 - methyl-2,5-dioxabicyclo[4.3.0]nonane
1,8-dichloro-7,9 - bis(ethylenedioxy) - 3-(4 - hydroxypropyl)-2,5-dioxabicyclo[4.3.0]nonane
1,8-dibromo-7,9 - bis(ethylenedioxy) - 3 - (4-hydroxypropyl)-2,5-dioxabicyclo[4.3.0]nonane The following examples demonstrate compounds of Formula A, which are dimers of Formula A. Example XIII illustrates the manner in which such compounds are made by producing a compound of Formula A and then heating it in solution, while Example XIV illustrates the preparation of a similar compound by heating the corresponding compound of Formula A to a temperature above its melting point.

Example XIII.—1,2,3,4,5,6,7,8-octachloro-3,7-tricyclo-[4.3.0.1$^{2,5}$]decadiene-9,10-dione di(glycerine-1,2)-diketal A three-necked, 5-liter flask was charged with 32 moles of glycerine (2944 grams). Potassium hydroxide (8.40 moles, 538 grams) was added in portions. To this solution at 85° C., 4 moles (1091 grams) of hexachlorocyclopentadiene was added. The reaction mixture was stirred at 85° C. to 90° C. for 17.5 hours, at which time the mixture was acidic. An additional 27 grams of solid potassium hydroxide was added, which was consumed in 5 hours. Another 27 grams of potassium hydroxide was added, which in turn was consumed in 21.0 hours. The reaction mixture was then cooled to room temperature, filtered and a small amount of chloroform was added. The mixture was steam distilled to remove the unreacted starting material and low-boiling impurities; during the distillation the reaction mixture was at a temperature of about 100° C. whereupon the initial product dimerized. The residue was then separated from water and dried at 125° C. to 135° C. at 0.1 millimeter. The yield of 1,2,3,4-tetrachlorocyclopentadiene-1-one glycerine ketal dimer was 842 grams.

Example XIV.—1,2,3,4,5,6,7,8-octachloro - 3,7 - tricyclo-[4.3.0.1$^{2,5}$]decadiene-9,10-dione di(2,3-butylene glycol) diketal Five grams of 1,2,3,4-tetrachloro-7,8-dimethyl-6,9-dioxa-1,3-spiro[4.4]nonadiene was heated in a test tube on a steam bath for 5 hours to give a hard resin. This resin was distilled; the fraction boiling at 200° C. to 220° C. at 0.10 millimeter was found to be a mixture of the isomeric diketals. The mixture of isomers was dissolved in ether and an insoluble solid was filtered and collected. This solid was then crystallized from chloroform and ligroin (boiling point 85° C. to 100° C.) to give a product having a melting point of 192° C. to 194° C. This was one solid isomer of the diketal.

Analysis. — Calculated for $C_{18}H_{16}Cl_8O_4$: Carbon, 37.27%; hydrogen, 2.78%; chlorine, 48.91%. Found: Carbon, 36.81%; hydrogen, 2.35%; Chlorine, 49.84%.

All the compounds corresponding to Formula A recited hereinabove produce their dimers in an equivalent manner, for example:

1,2,3,4,5,6,7,8-octachloro - 3,7 - tricyclo[4.3.0.1$^{2,5}$]decadiene-9,10-dione di(cyclohexyl - 1,2 - ethylene glycol) diketal
1,2,3,4,5,6,7,8-octachloro - 3,7 - tricyclo[4.3.0.1$^{2,5}$]decadiene-9,10-dione di(cyclohexyl - 1,2 - ethylene glycol) diketal
1,2,3,4,5,6,7,8-octachloro - 3,7 - tricyclo[4.3.0.1$^{2,5}$]decadiene-9,10-dione di(phenyl-1,2-ethylene glycol) diketal
1,2,3,4,5,6,7,8-octabromo - 3,7 - tricyclo[4.3.0.1$^{2,5}$]decadiene-9,10-dione di(phenyl-1,2-ethylene glycol) diketal
1,2,3,4,5,6,7,8-octachloro - 3,7 - tricyclo[4.3.0.1$^{2,5}$]decadiene-9,10-dione di(1-methoxy-2,3-propylene glycol) diketal
1,2,3,4,5,6,7,8-octabromo - 3,7 - tricyclo[4.3.0.1$^{2,5}$]decadiene-9,10-dione di(1-methoxy-2,3-propylene glycol) diketal
1,2,3,4,5,6,7,8-octachloro - 3,7 - tricyclo[4.3.0.1$^{2,5}$]decadiene-9,10-dione di(1-phenoxy-2,3-propylene glycol) diketal
1,2,3,4,5,6,7,8-octabromo - 3,7 - tricyclo[4.3.0.1$^{2,5}$]decadiene-9,10-dione di(1-phenoxy-2,3-propylene glycol) diketal
1,2,3,4,5,6,7,8-octachloro - 3,7 - tricyclo[4.3.0.1$^{2,5}$]decadiene-9,10-dione di(6-hydroxy-1,2-hexane glycol) diketal
1,2,3,4,5,6,7,8-octabromo - 3,7 - tricyclo[4.3.0.1$^{2,5}$]decadiene-9,10-dione di(6-hydroxy-1,2-hexane glycol) diketal While the examples show specific reactants, all the polyols and alcohols enumerated in the specification, as well as not specifically enumerated, are reactive in a similar manner to produce compounds within the scope of the invention.

Likewise, while the above examples demonstrate the invention using hexachlorocyclopentadiene, other hexahalocyclopentadienes, such as hexabromocyclopentadiene, and including cyclopentadiene derivatives containing different halogens in the same molecule, such as 1,2-dibromo-3,4,5,5-tetrachlorocyclopentadiene and 2,3-dibromo-1,4,5,5-tetrachlorocyclopentadiene are also contemplated for use herein and produce corresponding halogen-containing products. Similarly, although for clarity the invention has been described and exemplified using a single alcohol in each reaction or step, mixtures of polyols or, in the appropriate instance, mixtures or monohydroxy alcohols can also be employed.

The compounds of this invention are useful in several varied applications. They find utility, for example, as insecticides and nematocides. To exemplify their activity in this regard, the compound of Example VIII, applied as a 2.5 percent solution in acetone, topically to the thorax of houseflies (Wilson), effectively killed the flies. The nematocidal activity of the compounds described herein was shown by tests such as one in which the compound of Example I was applied as a solution in an acetone-water mixture to a suspension of Panagrellus nematodes in water (500 to 750 nematodes per milliliter); it was found that this treatment was extremely effective in destroying the nematodes, even using very low concentrations of the compound, e.g., .0001 percent.

In addition to their use as insecticides and in related applications, the compounds of the invention have various other uses, depending upon their particular properties. For examples, compounds of Formula A and Formula B react with olefinic compounds to produce Diels-Alder addition products that can be utilized in making resinous materials in which halogens are sought to be introduced. For example, the reaction of the compound of Example II with maleic anhydride results in a material from which polyester resins can be obtained. Similarly, the reactants of compounds of Formula D with reactive dienes such as cyclopentadiene result in products which, after oxidation, can be used to produce polyester resins.

In many instances, the halogen contents of the various compounds are such as to produce specifically desired results. For instance, compounds of Formula C are quite useful as plasticizers in systems wherein a high but limited amount of halogen is desired, and compounds of Formula D, which have extremely high halogen content, can be added to conventional foam-producing compositions to increase the fire-retardancy of the foams produced therefrom.

According to the provisions of the patent statutes, there are described above the invention and what are now considered to be its best embodiments.

I claim:
1. A compound of the formula:

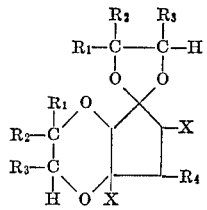

where X is chlorine or bromine, $R_1$, $R_2$ and $R_3$ are each selected from the class consisting of hydrogen and alkyl, cycloalkyl, phenyl, alkoxyalkyl, phenyloxyalkyl and hydroxyalkyl groups containing 1 to 10 carbon atoms and $R_4$ is selected from the class consisting of the structures:

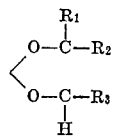

and

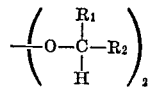

where $R_1$, $R_2$ and $R_3$ are as defined above.

2. The compound of claim 1 in which X is chlorine.
3. A compound as in claim 1 where $R_1$, $R_2$ and $R_3$ are selected from the group consisting of hydrogen and alkyl containing 1 to 10 carbon atoms.
4. A compound as in claim 3 wherein X is chlorine.
5. A compound as in claim 1 which is 1,8-dichloro-7,9-bis(ethylenedioxy)-2,5-dioxabicyclo[4.3.0]nonane.
6. A compound as in claim 1 which is 1,8-dichloro-7,9-bis(ethylenedioxy) - 3-methyl-2,5-dioxabicyclo[4.3.0]nonane.
7. A compound as in claim 1 which is 1,8-dichloro-7,9 - bis(1,2 - propylenedioxy) - 2,5-dioxabicyclo[4.3.0]nonane.
8. A method of producing a compound as in claim 1 of the formula:

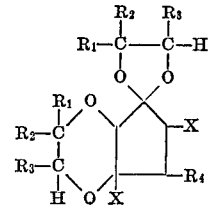

where X is chlorine or bromine, $R_1$, $R_2$ and $R_3$ are each selected from the class consisting of hydrogen and alkyl, cycloalkyl, phenyl, alkoxyalkyl, phenyloxyalkyl and hydroxyalkyl groups containing 1 to 10 carbon atoms and $R_4$ is

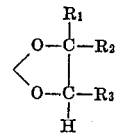

where $R_1$, $R_2$ and $R_3$ are as defined above, which comprises reacting a preformed compound of the formula:

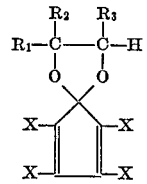

where X, $R_1$, $R_2$ and $R_3$ are as defined above, with a polyol of the formula:

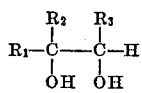

where $R_1$, $R_2$ and $R_3$ are as defined above, at a temperature of at least about 80° C. in the presence of a base selected from the group consisting of lithium, potassium, sodium, calcium, magnesium and hydroxides, alkoxides and oxides thereof, and using at least about two moles of each of said polyol and said base per mole of said preformed compound.

9. A method as in claim 8 in which X is chlorine and said base is an alkali metal hydroxide.

10. A method of producing a compound as in claim 1 of the formula:

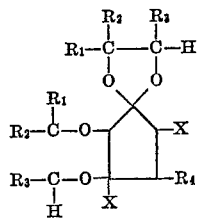

where X is chlorine or bromine, $R_1$, $R_2$ and $R_3$ are each selected from the class consisting of hydrogen and alkyl, cycloalkyl, phenyl, alkoxyalkyl, phenyloxyalkyl and hydroxyalkyl groups containing 1 to 10 carbon atoms and $R_4$ is selected from the class consisting of the structures:

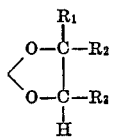

and

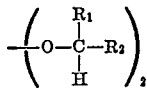

wherein $R_1$, $R^2$ and $R_3$ are as defined above, which comprises reacting a preformed compound of the formula:

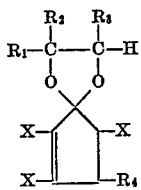

where $R_1$, $R_2$ and $R_3$ are as defined above and $R_4$ is selected from the class consisting of the structures:

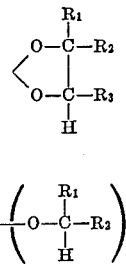

and

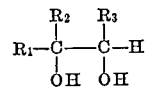

where $R_1$, $R_2$ and $R_3$ are as defined above, with a polyol of the formula:

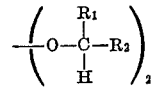

where $R_1$, $R_2$ and $R_3$ are as defined above, at a temperature of at least about 80° C. in the presence of a base selected from the group consisting of lithium, potassium, sodium, calcium, magnesium and hydroxides, alkoxides and oxides thereof, and using at least about one mole of each of said polyol and said base per mole of said preformed compound.

11. A method as in claim 10 in which the halogen is chlorine and the base is an alkali metal hydroxide.

References Cited

UNITED STATES PATENTS 2,698,329   12/1954   Thompson _____ 260—340.3
2,844,593   7/1958    Riener et al. ____ 260—340.9 X
2,967,183   1/1961    Ruh et al. _____ 260—340.9

ALEX MAZEL, *Primary Examiner.*

JAMES H. TURNIPSEED, *Assistant Examiner.*

U.S. Cl. X.R.

167—33; 260—30.4, 45.8, 75, 338, 340.9, 611